(12) United States Patent
Tanaka et al.

(10) Patent No.: US 8,381,987 B2
(45) Date of Patent: Feb. 26, 2013

(54) INSERTABLE STORAGE CARD CONTAINING A PORTABLE MEMORY CARD HAVING A CONNECTION INTERFACE

(75) Inventors: Kazuna Tanaka, Cos Cob, CT (US);
Jeffrey S. Kapec, Westport, CT (US);
Yukiko Naoi, New York, NY (US);
Christiano Butler, Bardonia, NY (US);
Steven Wicksman, Putnam Valley, NY (US)

(73) Assignee: MELA Sciences, Inc., Irvington, NY (US)

( * ) Notice: Subject to any disclaimer, the term of this patent is extended or adjusted under 35 U.S.C. 154(b) by 334 days.

(21) Appl. No.: 12/512,895

(22) Filed: Jul. 30, 2009

(65) Prior Publication Data
US 2011/0024507 A1 Feb. 3, 2011

(51) Int. Cl.
*G06K 7/00* (2006.01)
*G06K 19/00* (2006.01)

(52) U.S. Cl. ......................... 235/486; 235/487
(58) Field of Classification Search .................. 235/487, 235/486, 492
See application file for complete search history.

(56) References Cited

U.S. PATENT DOCUMENTS

| | | |
|---|---|---|
| 4,817,044 A | 3/1989 | Ogren |
| 4,841,134 A * | 6/1989 | Hida et al. .................. 235/488 |
| D338,272 S | 8/1993 | Cunagin et al. |
| 5,314,243 A | 5/1994 | McDonald et al. |
| 5,348,324 A | 9/1994 | Trotta |
| D352,106 S | 11/1994 | Fanney et al. |
| 5,536,084 A | 7/1996 | Curtis et al. |
| 5,564,803 A | 10/1996 | McDonald et al. |
| 5,623,869 A | 4/1997 | Moss et al. |
| 5,702,115 A | 12/1997 | Pool |
| D389,917 S | 1/1998 | Hornback et al. |
| 5,765,842 A | 6/1998 | Phaneuf et al. |
| 5,806,943 A | 9/1998 | Dell et al. |
| D406,894 S | 3/1999 | Menhennett et al. |
| D412,748 S | 8/1999 | Nabarro |
| 6,022,088 A | 2/2000 | Metzler |
| 6,081,612 A | 6/2000 | Gutkowicz-Krusin et al. |
| D430,867 S | 9/2000 | Smith et al. |

(Continued)

FOREIGN PATENT DOCUMENTS

| | | |
|---|---|---|
| EP | 1 505 765 A1 | 2/2005 |
| EP | 1 658 817 A1 | 5/2006 |

(Continued)

OTHER PUBLICATIONS

Slides depicting a mock user interface of a prototype medical cart, American Academy of Dermatology conference (Feb. 2009), 19 pages.

(Continued)

*Primary Examiner* — Thien M Le
*Assistant Examiner* — Toan Ly
(74) *Attorney, Agent, or Firm* — Fish & Richardson P.C.

(57) ABSTRACT

Among other things, a portable memory card that conforms to a size, shape, and connection interface of an industry-standard memory card is smaller than and held by a support that conforms to a shape and size of an industry-standard credit card. The support is insertable into a receptacle with the connection interface of the memory card mated with a corresponding connection interface of the receptacle.

20 Claims, 3 Drawing Sheets

U.S. PATENT DOCUMENTS

| | | | |
|---|---|---|---|
| D434,502 S | 11/2000 | Gallant |
| 6,189,843 B1 | 2/2001 | Pfister |
| 6,208,749 B1 | 3/2001 | Gutkowicz-Krusin et al. |
| D446,861 S | 8/2001 | Meziere et al. |
| 6,307,957 B1 | 10/2001 | Gutkowicz-Krusin et al. |
| 6,319,201 B1 | 11/2001 | Wilk |
| 6,339,732 B1 | 1/2002 | Phoon et al. |
| 6,374,752 B1 | 4/2002 | Walser |
| 6,378,816 B1 | 4/2002 | Pfister |
| 6,435,109 B1 | 8/2002 | Dell et al. |
| 6,457,647 B1 | 10/2002 | Kurihashi et al. |
| D467,001 S | 12/2002 | Buczek et al. |
| 6,493,217 B1 | 12/2002 | Jenkins, Jr. |
| 6,493,220 B1 | 12/2002 | Clark et al. |
| 6,563,616 B1 | 5/2003 | Brenner |
| 6,626,445 B2 | 9/2003 | Murphy et al. |
| 6,626,558 B2 | 9/2003 | Momot et al. |
| 6,654,378 B1 | 11/2003 | Mahany et al. |
| 6,655,545 B1 | 12/2003 | Sonneborn |
| 6,657,798 B1 | 12/2003 | Kabelevs et al. |
| D486,915 S | 2/2004 | Warschewske et al. |
| 6,688,634 B2 | 2/2004 | Noffsinger |
| 6,710,947 B1 | 3/2004 | Momot et al. |
| 6,715,722 B2 | 4/2004 | Roberts |
| 6,722,673 B1 | 4/2004 | Hamlin |
| 6,726,101 B1 | 4/2004 | McIntyre et al. |
| 6,942,417 B2 | 9/2005 | Schwarzbich |
| D512,508 S | 12/2005 | Mesaros |
| 6,980,419 B2 | 12/2005 | Smith et al. |
| D517,768 S | 3/2006 | Arceta |
| D518,267 S | 3/2006 | Arceta |
| 7,009,840 B2 | 3/2006 | Clark et al. |
| 7,041,941 B2 | 5/2006 | Faries, Jr. et al. |
| 7,096,282 B1 | 8/2006 | Wille |
| 7,102,672 B1 | 9/2006 | Jacobs |
| 7,127,094 B1 | 10/2006 | Elbaum et al. |
| 7,130,190 B1 | 10/2006 | Baker |
| D531,728 S | 11/2006 | Helgeson |
| 7,191,950 B1 | 3/2007 | Petrovich et al. |
| D539,794 S | 4/2007 | Rossini et al. |
| D544,962 S | 6/2007 | Diener et al. |
| D548,918 S | 8/2007 | Nussberger |
| D550,362 S | 9/2007 | Olivera et al. |
| D552,740 S | 10/2007 | Park |
| 7,278,583 B2 * | 10/2007 | Lee ................ 235/492 |
| 7,311,254 B2 | 12/2007 | Olsen |
| D561,342 S | 2/2008 | Zimmer |
| 7,338,055 B2 | 3/2008 | Fuentes |
| 7,341,198 B2 * | 3/2008 | Nishizawa et al. ........... 235/492 |
| 7,352,570 B2 | 4/2008 | Smith et al. |
| D568,258 S | 5/2008 | Adam |
| D568,481 S | 5/2008 | Martinson |
| 7,367,571 B1 | 5/2008 | Nichols |
| 7,401,796 B1 | 7/2008 | Greco |
| 7,461,825 B2 | 12/2008 | Olivera et al. |
| D585,991 S | 2/2009 | Helgeson et al. |
| 7,490,837 B2 | 2/2009 | Pond et al. |
| D588,272 S | 3/2009 | Meiser |
| D596,420 S | 7/2009 | Yoshida |
| 7,562,883 B2 | 7/2009 | Livengood et al. |
| 7,564,359 B2 * | 7/2009 | Koh et al. ................... 340/572.8 |
| 7,591,786 B2 | 9/2009 | Holmberg et al. |
| 7,594,668 B2 | 9/2009 | Arceta et al. |
| 7,612,999 B2 | 11/2009 | Clark et al. |
| 7,621,544 B2 | 11/2009 | Rossini |
| 7,654,261 B1 | 2/2010 | Rockhold |
| D613,866 S | 4/2010 | Tanaka et al. |
| D613,867 S | 4/2010 | Tanaka et al. |
| 7,719,420 B2 | 5/2010 | Christie et al. |
| 7,761,332 B2 | 7/2010 | Capurso et al. |
| 7,791,866 B2 | 9/2010 | Clark et al. |
| 7,806,376 B2 | 10/2010 | Song et al. |
| D629,523 S | 12/2010 | Porter et al. |
| 7,849,859 B2 | 12/2010 | Bochner et al. |
| 7,859,836 B2 | 12/2010 | Bae |
| 7,884,735 B2 | 2/2011 | Newkirk |
| D639,960 S | 6/2011 | Boudier et al. |
| D643,535 S | 8/2011 | Ross et al. |
| 7,990,691 B2 | 8/2011 | Clark et al. |
| 8,056,910 B2 | 11/2011 | Deavila |
| 8,075,071 B1 | 12/2011 | Whittall |
| D652,521 S | 1/2012 | Ross et al. |
| 8,109,527 B2 | 2/2012 | Bustle et al. |
| D657,470 S | 4/2012 | Schon et al. |
| 2001/0035702 A1 | 11/2001 | Murphy et al. |
| 2001/0051787 A1 | 12/2001 | Haller et al. |
| 2002/0004863 A1 | 1/2002 | Kazo |
| 2002/0010679 A1 | 1/2002 | Felsher |
| 2002/0013640 A1 | 1/2002 | Phoon et al. |
| 2002/0016720 A1 | 2/2002 | Poropatich et al. |
| 2002/0021828 A1 | 2/2002 | Papier et al. |
| 2002/0040954 A1 | 4/2002 | Roberts |
| 2002/0059081 A1 | 5/2002 | Yasuda et al. |
| 2002/0076954 A1 | 6/2002 | Chen et al. |
| 2003/0130567 A1 | 7/2003 | Mault et al. |
| 2003/0155731 A1 | 8/2003 | Ditges et al. |
| 2003/0201697 A1 | 10/2003 | Richardson |
| 2003/0222548 A1 | 12/2003 | Richardson et al. |
| 2004/0068255 A1 | 4/2004 | Short et al. |
| 2004/0165348 A1 | 8/2004 | Clark et al. |
| 2004/0179332 A1 | 9/2004 | Smith et al. |
| 2004/0217564 A1 | 11/2004 | Oitges et al. |
| 2004/0255081 A1 | 12/2004 | Arnouse |
| 2004/0262867 A1 | 12/2004 | Arceta et al. |
| 2005/0017468 A1 | 1/2005 | Gallant et al. |
| 2005/0035198 A1 | 2/2005 | Wilensky |
| 2005/0200707 A1 * | 9/2005 | Yogesan et al. .......... 348/207.99 |
| 2006/0015752 A1 * | 1/2006 | Krueger ..................... 713/193 |
| 2006/0094277 A1 * | 5/2006 | Yang et al. .................... 439/328 |
| 2006/0095297 A1 | 5/2006 | Virik |
| 2006/0125356 A1 | 6/2006 | Meek et al. |
| 2006/0130714 A1 | 6/2006 | Jones et al. |
| 2006/0186209 A1 * | 8/2006 | Narendra et al. ............. 235/492 |
| 2006/0255553 A1 | 11/2006 | Gust et al. |
| 2006/0278723 A1 | 12/2006 | Dan et al. |
| 2007/0001413 A1 | 1/2007 | Rossini |
| 2007/0006322 A1 | 1/2007 | Karimzadeh et al. |
| 2007/0043594 A1 | 2/2007 | Lavergne |
| 2007/0078678 A1 | 4/2007 | DiSilvestro et al. |
| 2007/0185390 A1 | 8/2007 | Perkins et al. |
| 2007/0216267 A1 | 9/2007 | Johanning |
| 2007/0228680 A1 | 10/2007 | Reppert et al. |
| 2008/0031537 A1 | 2/2008 | Gutkowicz-Krusin et al. |
| 2008/0078071 A1 | 4/2008 | Gong |
| 2008/0214907 A1 | 9/2008 | Gutkowicz-Krusin et al. |
| 2008/0251661 A1 | 10/2008 | Rossini |
| 2008/0252045 A1 | 10/2008 | Rossini et al. |
| 2008/0255448 A1 | 10/2008 | Zhu et al. |
| 2008/0312952 A1 | 12/2008 | Gulfo et al. |
| 2009/0015116 A1 | 1/2009 | Arceta et al. |
| 2009/0060304 A1 | 3/2009 | Gulfo et al. |
| 2009/0101219 A1 | 4/2009 | Martini et al. |
| 2009/0154781 A1 | 6/2009 | Bogdan |
| 2009/0212518 A1 | 8/2009 | Bustle et al. |
| 2009/0212670 A1 | 8/2009 | Bustle et al. |
| 2009/0261549 A1 | 10/2009 | Kral |
| 2009/0315287 A1 | 12/2009 | Rossini |
| 2009/0319079 A1 | 12/2009 | Arceta et al. |
| 2010/0148458 A1 | 6/2010 | Ross et al. |
| 2010/0213679 A1 | 8/2010 | Smith et al. |
| 2011/0025007 A1 | 2/2011 | Butler et al. |
| 2011/0042911 A1 | 2/2011 | Kozlowski et al. |
| 2011/0272902 A1 | 11/2011 | Arceta et al. |
| 2012/0118981 A1 | 5/2012 | Tanaka et al. |
| 2012/0126503 A1 | 5/2012 | Butler et al. |

FOREIGN PATENT DOCUMENTS

| | | |
|---|---|---|
| JP | 2007-293663 | 11/2007 |
| WO | WO 88/09973 | 12/1998 |
| WO | WO 03/001329 | 1/2003 |
| WO | WO 03/060650 | 7/2003 |
| WO | WO 2005/072638 | 8/2005 |
| WO | WO 2005/109297 | 11/2005 |
| WO | WO 2006/060286 | 6/2006 |
| WO | WO 2006/122741 | 11/2006 |
| WO | WO 2007/022017 | 2/2007 |

| | | |
|---|---|---|
| WO | WO 2007/038262 | 4/2007 |
| WO | WO 2011/014614 | 2/2011 |
| WO | WO 2011/014656 | 2/2011 |

OTHER PUBLICATIONS

Script used during demonstration of a mock user interface of a prototype medical cart, American Academy of Dermatology conference (Feb. 2009), 5 pages.
Photographs of a medical cart used in clinical trials (Dec. 2006-Jul. 2008), 11 pages.
International Search Report for App. Ser. No. PCT/US2008/066636, dated Oct. 16, 2008, 16 pages.
International Preliminary Report on Patentability for App. Ser. No. PCT/US2008/066636, dated Dec. 17, 2009, 14 pages.
U.S. Appl. No. 29/341,111, filed Jul. 30, 2009.
U.S. Appl. No. 29/341,114, filed Jul. 30, 2009.
U.S. Appl. No. 11/761,816, filed Jun. 12, 2007.
International Search Report and Written Opinion for App. Ser. No. PCT/US2010/055273, dated Jun. 23, 2011, 12 pages.
Electro-Optical Sciences, Inc., Needham & Co. 7$^{th}$ Annual Bio/MedTech Conferene, Presentation re MELAFIND (Jun. 11, 2008, 35 pages).
Electro-Optical Sciences, Inc. 2008 Annual Report (Apr. 15, 2009, 88 pages).
Electro-Optical Sciences, Inc. 2007 Annual Report (Apr. 15, 2008, 96 pages).
Van Dusen, A., "Invasive biopsies may soon be a thing of the past if these detection methods prove effective," *Forbes* (Aug. 22, 2008, 3 pages).
Thumbnail image titled "eos-moneyshot.jpg" downloaded from http://images.google.com on Jul. 27, 2009, and source code indicating that the thumbnail image was orginally available on http://www.daniellicalzi.com on Jun. 2009, 2 pages.
Howard Teacher's Pet—Revolutionary Classroom Management, http://www.howardcomputers.com/petcart/, downloaded from internet on Jul. 30, 2009, 6 pages.
FreelanceDesigners.org, Daniel LiCalzi, Live Beta, downloaded from the internet on Jun. 26, 2009, 3 pages.
Tanaka Kapec Design Group, Inc., Strategic Product Development + Industrial Design, http://www.tkdg.com/, downloaded from the internet on Jun. 26, 2009, 3 pages.
Advanced Medical Optics, Inc. Quarterly Report (10-Q), filed May 10, 2006 [retrieved on Jun. 12, 2007]. Retrieved from the Internet: http://sec.edgar-online.com/2006/05/10/0001104659-06-033180/Section 8.asp (17 pages).
Advanced Medical Optics, Inc., "AMO develops advanced, life-improving vision technologies for people of all ages" [retrieved on Jun. 12, 2007]. Retrieved from the Internet: http://www.amo-inc.com (3 pages).
Electro Optical Sciences 2006 Annual Form 10-K Report, filed Mar. 15, 2007 [retrieved on Oct. 9, 2008]. Retrieved from the Internet: URL:http://ccbn.10kwizard.com/xml/download.php?repo=tenk&ipage=4745835&format=PDF, p. 1, para 2-3; p. 8, para 5.
"HIPAA Compliance and Smart Cards: Solutions to Privacy and Security Requirements," Smart Card Alliance, Sep. 2003 (46 pages).
International Search Report for PCT/US08/66508, dated Sep. 25, 2008 (17 pages).
International Search Report for PCT/US08/66636, dated Oct. 16, 2008 (16 pages).
LAMBDA Scientifica SPA, "KLS Smart Card" [retrieved on Jun. 12, 2007]. Retrieved from the Internet: www.lambdascientifica.com/pagina.asp&lingua=&gruppo=9&categoria=39&id=134 (2 pages).
LAMBDA Scientifica Srl, "erbium&diode dental laser" [retrieved on Jun. 12, 2007]. Retrieved from the Internet: http://www.doctorsmile.cz/img/erbdiod.pdf (12 pages).
MIAC Card Program [retrieved on Jun. 8, 2007]. Retrieved from the Internet: http://www.miaccard.com/miac_ps.html (1 page).
Patent Application for U.S. Appl. No. 29/341,111, filed Jul. 30, 2009.
Patent Application for U.S. Appl. No. 29/341,114, filed Jul. 30, 2009.
Patent Application for U.S. Appl. No. 12/512,775, filed Jul. 30, 2009.
Supplementary European Search Report for App. Ser. No. EP 08 77 0774, dated Aug. 23, 2010, 2 pages.
Public Law 104-191 [H.R. 3103] Aug. 21, 1996, Health Insurance Portability and Accountability Act of 1966, 104 P.L. 191; 110 Stat. 1936; 1996 Enacted H.R. 3103; 104 Enacted H.R. 3103.
International Search Report and Written Opinion for App. Ser. No. PCT/US2010/043713, dated Apr. 20, 2011, 7 pages.
International Search Report and Written Opinion for App. Ser. No. PCT/US2010/043644, dated Apr. 29, 2011, 9 pages.
U.S. Appl. No. 12/512,775, filed Jul. 30, 2009.
International Preliminary Report on Patentability for App. Ser. No. PCT/US2010/043713, dated Jan. 31, 2012, 6 pages.
International Preliminary Report on Patentability for App. Ser. No. PCT/US2010/043644, dated Jan. 31, 2012, 6 pages.
Pending claims for U.S. Appl. No. 11/761,816, filed Jun. 12, 2007.
U.S. Appl. No. 13/387,652, filed Feb. 6, 2012.
U.S. Appl. No. 13/360,447, filed Jan. 27, 2012.
Pending claims for U.S. Appl. No. 12/512,775, filed Jul. 30, 2009.

\* cited by examiner

INSERTABLE STORAGE CARD CONTAINING A PORTABLE MEMORY CARD HAVING A CONNECTION INTERFACE

This application relates to U.S. patent application Ser. No. 11/761,816, filed Jun. 12, 2007, and incorporated here by reference in its entirety.

BACKGROUND

This description relates to a storage card.

SUMMARY

In general, in an aspect, a portable memory card that conforms to a size, shape, and connection interface of an industry-standard memory card is smaller than and held by a support that conforms to a shape and size of an industry-standard credit card. The support is insertable into a receptacle with the connection interface of the memory card mated with a corresponding connection interface of the receptacle.

Implementations may include one or more of the following features. The support includes a leading edge and an alignment slot along the leading edge that corresponds to an alignment tab on the receptacle, the alignment slot and the alignment tab permitting insertion of the support into the receptacle to enable mating of the corresponding connection interfaces and to prevent insertion of the support into the receptacle otherwise. The alignment slot is wider at its opening than the width of the alignment tab. The memory card is on one side of the alignment slot and along the edge. The alignment slot includes a tapered edge to guide the support into the receptacle. The leading edge of the support is broader than an edge of the memory card that bears the connection interface. The memory card comprises a Secure Digital (SD) card. The support comprises a plastic housing. The support includes a cover attached to the plastic housing with the memory card between the cover and the housing. The cover includes a metalized sheet. The cover is permanently attached to the housing. The memory card is attached to the support in a manner that renders the memory card unusable in a normal way if the memory card is removed from the support. The support bears a label to receive writing. The receptacle is part of a medical device. The memory card contains data representing a diagnostic image of a patient. The data relates to skin of the patient.

In general, in an aspect, for storing diagnostic image data of skin of a patient from a medical device, a credit-card sized unit includes a Secure Digital (SD) memory card to hold the data, a credit-card-sized support in which the memory card is held, the support having a leading edge to be inserted into a reader of the medical device, the support having an alignment slot along the leading edge to mate with an alignment tab of a receptacle of the medical device, the alignment slot being offset along the leading edge to prevent the support from being inserted incorrectly into the receptacle, the alignment slot including a tapered edge to guide the support into the receptacle, the memory card having sockets exposed along the leading edge to one side of the alignment slot, the support including a housing and a cover with the memory card between the housing and the cover, the memory card being attached to the support in a manner that renders the memory card unusable in a normal way if the memory card is removed from the support.

These and other features and aspects, and combinations of them, can be expressed as methods, apparatus, systems, program products, as means for performing a function, and in other ways.

Other advantages and features will become apparent from the description and the claims.

DESCRIPTION

Figure 1:
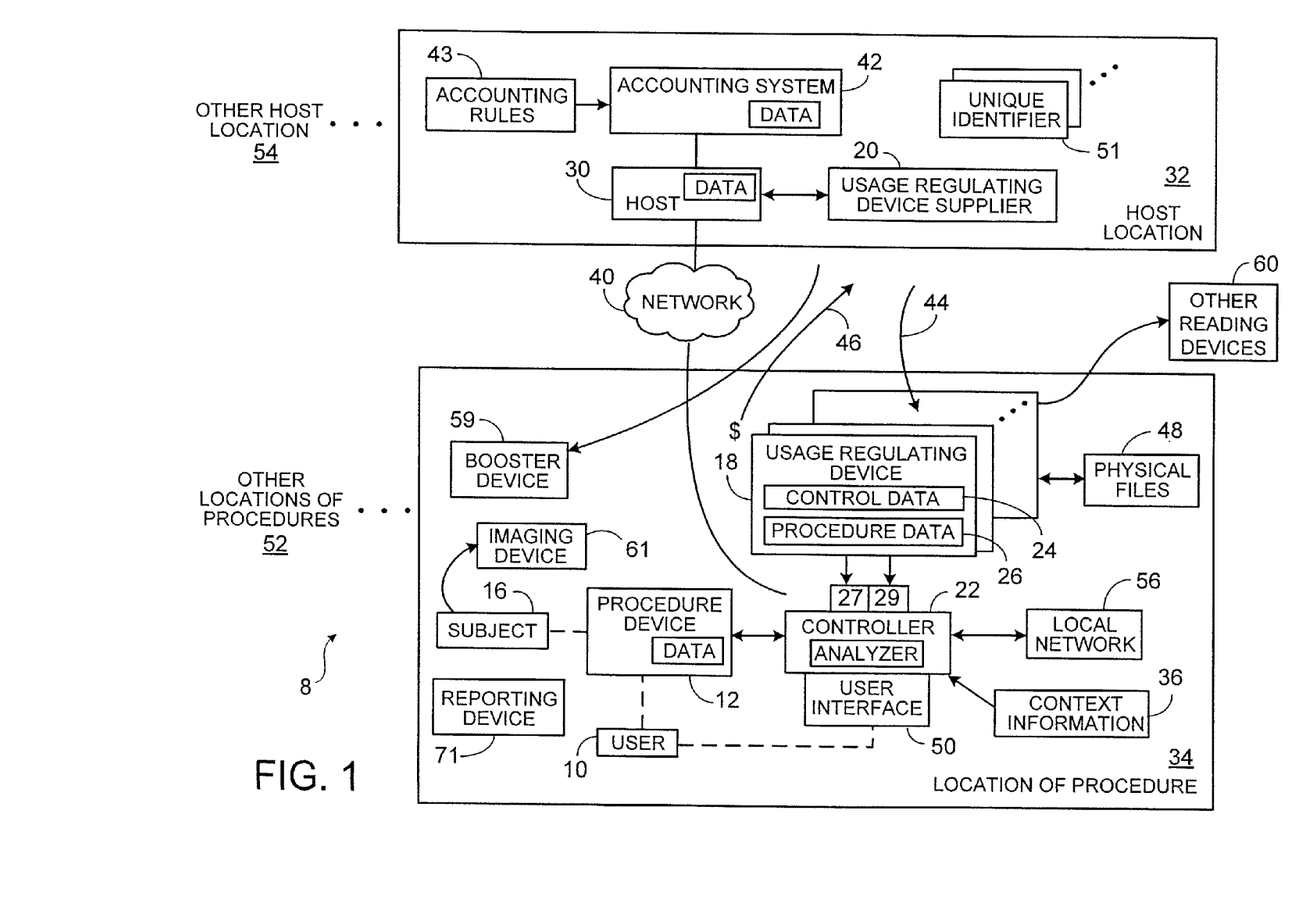
FIG. 1 is a block diagram.

As shown in FIG. 1, when a dermatologist (or other physician or diagnostic or therapeutic or cosmetic clinician, or other user) 10 uses a skin scanning device (or other diagnostic or therapeutic or cosmetic device, or other procedure device) 12 to scan a region of the skin (or perform any other diagnostic or therapeutic or cosmetic procedure, or other procedure) on a patient (or customer or other subject) 16, the cost (or the manner, context, circumstances, or other aspects) of using the device, e.g., to scan the skin, can be regulated using one or more digital memory cards (or memory sticks or memory disks or other memory devices or other usage regulating device or other devices) 18 that are sold, rented, or otherwise delivered by a supplier 20 to the user (or other buyer, renter, or recipient) 10. The use of the skin scanning device to scan the skin is regulated by a local computer or workstation (or other device, microprocessor, dedicated processor, chip, box, software, or controller) linked to (or associated with or operated with) the scanning device 22 based on data that indicate a number of available usages, a number of spent usages, conditions of usage, or other information on the basis of which usage can be controlled (or other kinds of control data) 24 and results and information from the procedure stored at least in part (and possibly also in other places) on the digital memory card.

Additional information concerning some implementations of a cart that incorporates a computer, a scanning device, and a card receptacle may be found in U.S. patent application Ser. No. 12/512,775, filed on the same day as this application, and incorporated here in its entirety by reference.

In some implementations, each card when used becomes associated with a particular patient (when we use the word patient, we are referring broadly to any person or subject of the procedure) and will allow a predefined number of uses for a patient session, for example, a number of lesions to be scanned. If at one session, more lesions must be scanned than are provided by the card, another similar card or a booster card that has been prepaid will be used for the patient session. In other business models, the cost per patient for use of the skin scanner may be capped. After the patient session (which may end after, say, four hours), in some examples, the card is retired and no longer usable for additional procedures. In other cases, the card may be used for the same patient over a longer period of time (say, six months).

Figure 2:
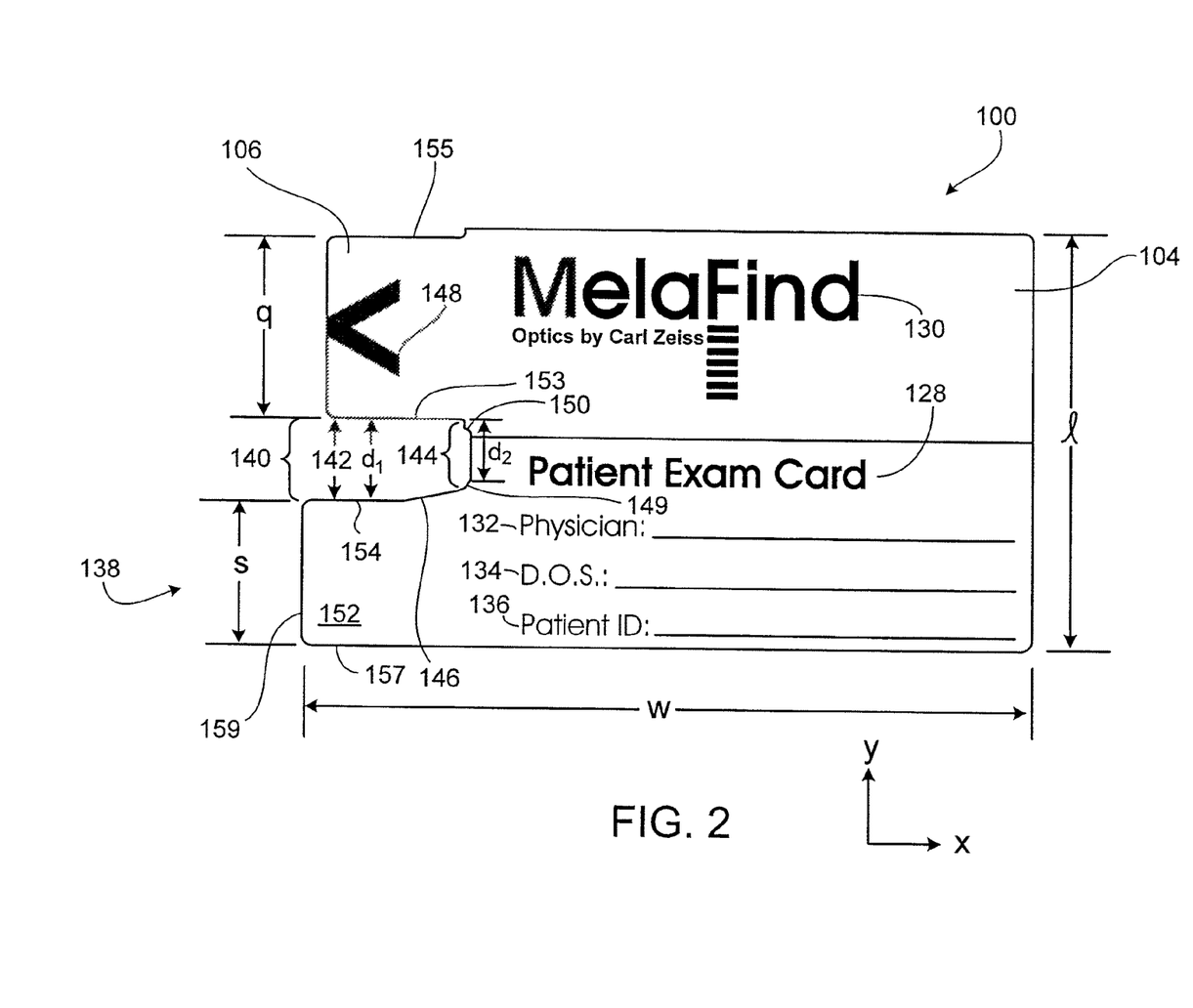
FIG. 2 is a front view of a storage card.
Figure 3:
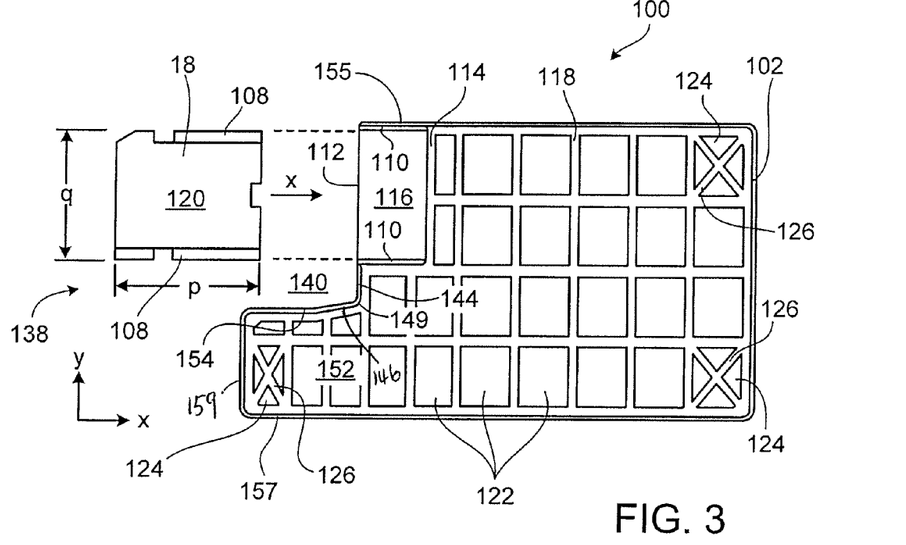
FIG. 3 is a front view of a storage card housing.

Referring to FIGS. 2 and 3, in some examples, the card may take the form of a storage card 100 in which a standard Secure Digital (SD) memory card 18 is held between a housing 102 made, e.g., of a molded plastic piece, and a covering layer 104 made, e.g., of a metal or a metalized sheet of other material, for protection, easy handling, and use of the memory card 18. Other standard memory cards having other configurations could be used, and other ways of holding the card could be devised. As shown in FIG. 2, the storage card 100 is larger than the memory card 18 that it holds. The memory card 100 has a shape and configuration that enables it to be inserted in and removed from a card receptacle (FIG. 4) of a medical device easily in a proper orientation.

One end of the storage card 100, which we call an insertion end 138 because it is the end that is inserted into the card receptacle first, there is an alignment slot 140 between a memory card tab 106 and a passive tab 152. When the slot 140 (or the card 18) is inserted along a direction x indicated by an arrow 148 on the surface of the memory card 100, e.g., the surface of the storage card tab 106, into a card receptacle of the computer or workstation linked to the scanning device 22 of FIG. 1, the computer or the workstation can interact with the memory card 100, e.g., read data stored on the memory card or transfer data onto the card 100, or perform a wide variety of other operations.

The alignment slot 140 has an open end 142, a stop end 144, and two alignment features 149, 150 at the inner corners where two parallel side edges 153, 154 of the slot meet the stop end 144. The alignment features 149, 150 can engage a corresponding key or an alignment tab in the card receptacle (which we also sometimes call a receiver) (FIG. 4) in the computer or the workstation.

The edge 153 of the alignment slot 140 is located at a distance q from the far edge 155 of the memory card tab 106, which corresponds to a length of the memory card 18 (FIG. 3) and is larger than the distance s from the edge 154 to the far edge 157 of the passive tab 152. The unequal distances prevent the user from mistakenly inserting the memory card 100 with the face (shown in FIG. 2) down. The edge 155 of the memory card tab 106 is recessed from the long edge of the storage card along the y direction to provide some clearance space. In some implementations, the edge 153 is also recessed relative to the alignment datum 150. The clearance spaces provided by the recession of the edges 155, 153 can make insertion of the storage card 100 easy and can protect the memory card 18 from damages. In some examples, the length q is about 0.85 inch and the length s can be about 0.75 inch.

At the open end 142, the alignment slot 140 has a width $d_1$, e.g., of about 0.38 inch, and across the stop end 144, the alignment slot 140 has a width $d_2$, e.g., of about 0.27 inch. A length from the outermost edge 159 of the passive tab 152 to the stop end 144 is, for example, about 0.75 inch to about 0.80 inch. The configuration of the insertion end 138 of the alignment slot 140 can also prevent use of unauthorized cards that do not have similar features in the computer or the workstation.

Along the edge 154 of the alignment slot 140, a sloped edge section 146 provides a taper from the broader-width open end 142 to the narrower-width stop end 144. The excess space between the corresponding side walls in the receiver (FIG. 4) and the edges of the open end 142 makes it easier for the user to start the insertion of the storage card 100 without requiring a high precision matching between the open end 142 and the receiver. During the insertion, the alignment slot 140 is guided by the slope 146 towards a precise match to the stop end 144 to complete the insertion of the card 100. In addition, at the insertion end 138 of the card 100, the passive tab 152 extends further out than the memory card tab 106 by a distance, e.g., of about 0.1 inch to about 0.2 inch or 0.11 inch. The insertion process is also aided by the extended passive tab, for example, by protecting the memory card tab 106 (and therefore, the memory card 18).

Figure 4:
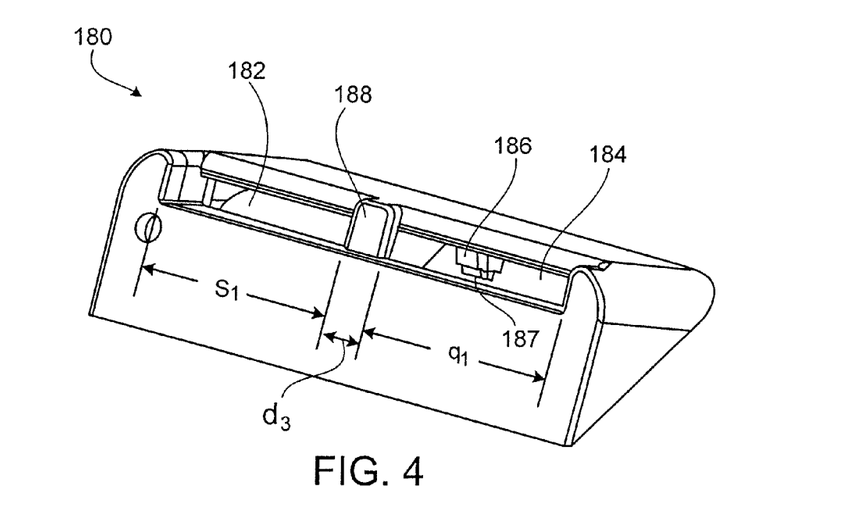
FIG. 4 is a perspective view of a card receptacle.

FIG. 4 shows an example of a card receptacle 180 for receiving the storage card 100. A leading edge of the card receptacle 180 includes an opening 182 separated from another opening 184 by an alignment tab 188. Inside the receptacle 180, a memory card reader 186 includes a connection interface that includes a row of pins that plug into a row of sockets that are part of a connection interface on the memory card. The connection interface in the receptacle is wired to a circuit board (not shown) that serves to read or write data in the memory card and to interact with a computer.

The tab 188 has a width $d_3$ that is the same as the width $d_2$ at the stop end 144 of the alignment slot 140 and engages with, e.g., the alignment slot 140 and stop end 144 during insertion (FIG. 2).

The tab 188 is located asymmetrically on the leading edge of the receptacle so that the opening 184 has a larger width $q_1$ than a width $s_1$ of the other opening 182. The width $q_1$ and the width $s_1$ of the openings 184, 182 in the receptacle 180 each is larger than the corresponding width q and s of the two tabs 106, 152 on the storage card, respectively, to allow an easy start of the insertion of the storage card 100. The width $s_1$ is smaller than the width q to prevent reversed insertion of the card (i.e., the memory card tab 106 into the opening 182 and the passive tab 152 into the opening 184). In some examples, the length $q_1$ and the length $s_1$ of FIG. 4 can be about 1.01 inch and 0.81 inch, respectively. Other dimensions can be used, for example, depending on the design of the receptacle 180. Additional information about card receptacles and work stations is discussed in U.S. patent application Ser. No. 12/512, 775, filed on the same day as this application, the entire contents of which are incorporated here by reference.

Therefore, when the storage card 100 (FIG. 2) is first inserted into the receptacle 180, the passive tab 152 serves as the leading portion of the storage card and enters the receptacle 180 first. As the tab 188 of the receptacle 180 approaches the slot 140, the memory card tab 106 also enters the receptacle. As the storage card 100 continues to be inserted, the tab 188 of the receptacle 180, which initially has additional room between the two edges 152, 154 of the alignment slot 140, strikes the tapered edge portion 146. This causes the storage card 100 to be more precisely aligned, so that with further insertion, the memory card tab 106 becomes very precisely oriented with respect to the connection interface of the receptacle 180. During the final stage of insertion, the electrical connections are made between the connection interfaces of the receptacle 180 and the memory card 18. Again, because the passive tab 152 extends farther than the memory card tab 106, damage to the memory card into the connection interfaces is less likely to happen. Also, even though the storage card 100 is considerably larger than the memory card 18, the storage card serves as a strong, protective housing for the memory card 18 and provides guiding features that help the user to connect the memory card 18 precisely and safely into the receptacle 180.

Referring again to FIGS. 2 and 3, the storage card 100 can have a width w of about 2.03 inches, a length l of about 3.50 inches, and a thickness (not labeled) of about 0.12 inches, that is, the size of a standard credit or debit card. This enables the storage card 100 to be readily placed in any commercially available card holders.

In some examples, the storage card 100 is assembled by sliding the memory card 18 along the direction x parallel to the width w of the memory card 100 onto a card pad 112 of the housing 102 such that the edges 108 of the memory card 18 engage grooves 110 of the card pad 112. The sliding of the memory card 18 along the x direction can be stopped by a ridge 114 of the housing 102 that extends above the surface 116 of the card pad 112. In the examples shown in FIG. 3, the ridge 114 has a height (not labeled) substantially the same as a thickness (also not labeled) of the memory card 18 and is part of a pattern of ribs that extend throughout the surface of the housing 102 in a grid form and separate recessed regions 122, to make the housing strong and light weight.

When assembled, an upper surface 120 of the memory card 18 and an upper surface 118 of the ridge 114 are substantially in the same plane to receive the covering layer 104. In some implementations, the covering layer 104 is permanently attached to the memory card 18 in a way such that detaching the covering layer 104 results in destruction of the memory card 18 and thus disables the usage of the memory card 18. Authorized use of the memory card is thus protected. Examples of ways for attaching the covering layer 104 can include use of a glue, e.g., epoxy, between the surface 118, 120, and the covering layer 104. In such an example, the epoxy is applied to pad 112 and to the bottom of the covering layer 104 in the region of pad 112, so that the memory card 18 is epoxied to the storage card. This helps to assure that if the memory card is ever removed from the storage card, the removal will damage the memory card and make it unusable.

The memory card 18 can be an SD card that has a length q of about 22-25 mm, a width p of about 30-32 mm, and a thickness of about 2.0 mm to about 3.0 mm.

In some examples, the memory card 18 is a write-once-read-many (WORM) memory card that contains proprietary security using hardware, software, and firmware features to prevent unauthorized access of the patient data stored in the memory card 18. The memory card 18 can also provide additional functions, such as a system check. The data used or stored on the memory card are encrypted based on the standards of the Health Insurance Portability and Accountability Act of 1996 (HIPAA).

The storage card 100 can be lightweight by the use of a plastic material, e.g., plastic materials used for other cards, such as credit cards, for the housing 102. The weight of the card 100 can be further reduced by minimizing the amount of the plastic materials used. For example, the housing 102 can be constructed by including the recessed regions 122 having a thickness (not labeled) of about 1/10 to about 2/3 of the total thickness of the memory card 100. The pattern of the ridges 114 enforces the strength of the housing 102 and the memory card 100 and prevents the card 100 from bending. In the example shown in FIG. 102, extra ridges 126 are included in corners 124 of the housing 102 to provide extra reinforcement to the memory card 100 at these corners, where initial forces are repeatedly received during insertions of the card, e.g., in use or into a card holder for storage. The ridges 114 can also have other patterns and can be added to any desired portions of the housing to reinforce the housing 102.

The covering layer 104 can be made, for example, of aluminum or anodized aluminum, and can have a surface shape and surface dimensions substantially the same as the assembled memory card 18 and the housing 102. The aluminum layer can be thin and can have a thickness of about 0.005 inch to about 0.01 inch, e.g., 0.008 inch. In addition to providing protection to the memory card 18, the covering layer 104 also provides extra strength reinforcement to the memory card 100 without substantially increasing the weight of the memory card 100. Information, such as the card name 128, the card provider's name 130, and others, can be color-printed on the surface of the aluminum layer. In some implementations, the surface of the aluminum layer can accept handwritten information so that the physician name 132, the date of service (DOS) 134, and the patient ID 136 can be identified on the memory card 100 to provide information and enhance security.

Referring back to FIG. 1, although our discussion often refers to the example of a skin scan of lesions of concern done by a physician on a patient, this is only an example and the techniques described here can be implemented in a wide variety of ways using a wide variety of procedure devices, applied to a wide variety of subjects, in a wide variety of contexts.

The data stored on the memory card can include not only control data 24 that enable regulation of uses of the scanning device, but also skin scanning data (or other procedure data) 26. The procedure data can include data generated during a particular procedure, such as image data, spectral data, and other measured data from the skin scan as well as a wide variety of other procedure-related data including care-providers notes, results of physical examination, clinical impression, and historical information from the patient. Information may also be included that enables the exact location of each lesion on the patient's body (x and y coordinates, for example) as well as the diameter, shape, border irregularity, and distance from an anatomic landmark. This information may be entered manually by the user or generated automatically as part of the automatic assessment of a lesion provided by the computer. The procedure-related data could include the identity, demographics, and other information associated with a patient as well as information associated with the scan, including a date and time, a serial number, calibration information, scanning parameter information, images, and the results of analysis of the scan data. Thus, the procedure data include information that is specific to a particular procedure that has been done, while much of the control data concern regulating how and under what circumstances the procedure is to be (or was) done. The procedure data can include the results of computer analyses that provide diagnostic information including, for example, a recommendation to biopsy to rule-out melanoma.

Some or all of the control data stored on the memory card can be loaded onto the card from a computer (or other host) 30 that is owned or controlled by the card supplier (or other host entity) 20 and is located at a central office (or other host location) 32. Although generally it is contemplated that the control data will be loaded onto the card only at the host location, other parts of the control data on the memory card might be loaded or updated or locked or unlocked by the computer 22 at the physician's office (or other location of the procedure or other location) 34.

Regulation of uses of the scanning device to perform skin scans can be based not only on a number of usages permitted by the memory card, but also on other information provided to the computer, such as the identity of the physician, and the type, model number, and serial number of the scanner (and a wide variety of other context information) 36. Such additional information may also be used to evaluate whether the card will be accepted and registered and whether (in certain cases) the card will be allowed to be re-used.

For instance, if the user were to use the skin scanner on lesions that clearly were not intended to be addressed by the scanner (e.g., because they did not meet the commonly used ABCD criteria for evaluating lesions), in some implementations, the card should not be considered spent. Unless the ABCD criteria are met, it would be a waste to permit the scan to be charged against the authorized uses on the memory card. However, by inserting the card into the reader, the physician could implicitly get a free ABCD determination on a lesion, for if the computer declines to charge the scan to the card, the physician knows that the ABCD decision was negative, otherwise positive. Thus the memory card has the function to activate the system for use or to allow the skin scanner to be used for the procedure. In some implementations, however, the card need not be connected to the computer for the computer to provide an explicit free ABCD scan and determination. Then, if the physician wishes to proceed with a biopsy recommendation, he or she could insert the card and allow it to be charged by the computer for that recommendation. In another example, if the user indicates that the lesion is not pigmented, the card would not be considered registered or spent for the scan. In some examples, these additional uses could be made without cost to the user. In some implementations, additional charges would be made for the uses perhaps at different rates, commensurate with the level of analysis provided by the analyzer and system.

In other words, in some cases, the card can be used to regulate and charge the usage of the procedure device only for procedures that are meant to be evaluated by the device. However, it is possible that this business model, permitting free limited scans to be done by the physician, could encourage the physician to use the skin scanner for inappropriate lesions without cost, while charging patients or insurance companies for the use of the skin scanner. In some implementations, the charge for inappropriate uses of the skin scanner could be made larger rather than smaller than for appropriate uses.

In some implementations, a determination must be made that the scanner is operating within specifications as confirmed by a periodic test required to be done. For example, every other week, a field test scan can be required to be done on a phantom target and the scanner calibrated accordingly. The system could require the results of the phantom test and validation that the scanner is operating within specifications to be reported to the host before any further scans could be done, or the computer could require permission from the host to allow for card acceptance and activation. If the skin scanner fails the self-diagnostic test, the memory cards should not be charged.

The memory cards are supplied to the users by physical delivery 44 in exchange for payments 46. The delivery and the payments are recorded by the host and reported to an accounting system 42. If free uses for indigent or uninsured patients are permitted, appropriate accounting entries are made for use of the associated cards.

The number of (and other control data or procedure data for) scans that have been performed is reported from time to time electronically by the computer through the Internet (or other communication network 40) to the host. The host in turn reports the performance of the scan to the accounting system 42 of the host entity. The accounting system then can, under Generally Accepted Accounting Principles (GAAP) (or other relevant accounting rules) 43, recognize or otherwise book as revenue the portion of the payment received for the memory card that is attributable to the scan that has been performed. This will also provide information as to whether unauthorized cards were used to activate the system, permitting the host to address fraudulent usage.

Some information associated with procedures that have been performed can be stored temporarily on the computer and later communicated to the host, for example, when the computer is also communicating other information to the host. After uploading, the information can be deleted from the computer at the procedure location.

A memory card that has been used for a scan can be stored in a typical physical patient file 48 associated with a patient. In that way, the card will automatically be handled in the same way as other patient information (such as x-rays, doctor's notes, and test results) for purposes of protecting patient privacy. The privacy-protected data need not be stored on the computer, the host, or any other non-complying device. Therefore, violation of privacy regulations, such as HIPAA, can be reduced or avoided.

In some implementations, the computer (and even the scanner) is the property of the party that supplies the memory cards and is lent to the physician for use in scanning. In those implementations, it could be argued to be a violation of privacy regulations for patient data to be stored on computer which is not owned by the physician. By storing the patient data on the memory card that is owned by the physician and stored in the patient's file, the requirements of privacy regulations can be met. Provisions could be made to assure that the data is deleted from the leased computer.

The procedure data and control data on the memory card can represent not only individual, distinct scans, but also can represent relationships between and among scans. For example, a patient's mole can be scanned on a number of occasions based on usages permitted by a card associated with the patient. In this example, the physician can insert a memory card previously used for a patient into the computer and immediately see differences between the prior scan stored on the card and a current scan that has just been completed and stored on a second card. For this purpose, the computer can include two different card reading devices 27 and 29 so that the old card can be read at the same time as the currently used card, and the images compared on the screen. Alternatively, the older card could be inserted, its image temporarily loaded into the RAM of the computer, and then the current card be re-inserted to provide the current image. The analyzer may be able to automatically analyze changes in a region of skin on the patient that includes the mole. Or, the system could display the two lesions side by side, or overlay the images, for review by the physician. The old scanned image and results of the analysis can be stored on the current card. This enables so-called mole mapping to be done more easily, more rigorously, and more effectively than with manual systems.

The computer includes a display that provides a user interface for the user 10 to interact with the system. The interface can enable the computer user to initialize the system, enter information, view images and other parts of the control data and procedure data, and generally control and manage the system.

A large number of physicians' offices and other health care delivery locations (and other procedure locations) 52 can be served by the system. A large number of host locations 54 can distribute cards and derive revenue from the scans that the cards regulate. Communication among the host locations, the procedure locations, and between host and procedure locations can be through any network.

The computer can be connected to a local network 56 at the procedure location for communication with other devices (not shown) including other procedure devices, other computers, and other computers, at that location, for example.

Many elements of the system 8 for regulating use of a device to perform a procedure on a subject, shown in FIG. 1, store data related to regulating the use of the procedure device 12 in performing the procedure on the subject 16.

The data stored for that purpose can vary widely and include information about the user, the subject, the procedure device, the context, the usage regulating devices, the supplier, the host, the financial accounts, procedures that are been performed or are to be performed, and data generated by the procedure or on the basis of which the procedure is performed.

For example, the control data can include the number of procedures permitted to be performed; the number of subjects on which the procedures can be performed (typically one per card, although a system might allow use on multiple subjects per card provided that it could accommodate privacy concerns); the location or locations at which the procedures can be performed; the times and dates on which the procedures can be performed; the brand, model, and serial number of the procedure device that can be used to perform the procedure; the name, identity, age, and demographic classification of the subjects; the type of procedure that can be performed among those that are possible for the procedure device to perform; the location, identity, size, and type of physical file in which the usage regulating device is to be stored; the identities of related usage regulating devices within a group of such devices (for example one among a set of memory cards); the name, identity, and other characteristics of the user who is permitted to perform the procedures; the identity, location, and other characteristics of the supplier; the name and identifier of the account in the accounting system that corresponds to the usage regulating device; the price paid for the usage regulating device or for each procedure that is permitted to be performed; an indication of the number of usages that remain available and the number that have been used; and a record of how often, when, by whom, and for what purpose the control data have been changed or reported to the host.

The procedure data can include data representing the results of the procedure such as an indicator whether the procedure was successful or unsuccessful; the location at which the procedure was performed; the place on the subject where the procedure was performed; the brand, model, and serial number of the procedure device used to perform the procedure; the name, identity, age, and demographic classification of the subject of the procedure; the type of procedure; the location, identity, size, and type of physical file in which the usage regulating device is stored; the name, identity, and other characteristics of the user who performed the procedure; the data produced by the procedure including image or graphical data, non-image data, parameter values, calibration values, the results of analytical processes applied to any of the other data including ultimate results (yes or no recommendation for biopsy, for example); intermediate hypotheses about conditions of the subject; and information regarding the time, date, and nature of the individuals to whom the data may be sent for additional interpretation as well as the results of their interpretation.

Just as a physician can store paper information and x-rays or other images in a patient file and later forward it to another clinician for review and consultation, the control data and procedure data stored on a memory card can be forwarded to others, for example, simply by handing or sending the memory card to the consultant, or by fetching the data from the card and forwarding it electronically to the consultant. Thus, the consultation can be achieved by a store and forward technique in which the memory cards provide the storage and the forwarding is done (for example, by the computer associated with the scanner or another computer) by any of a variety of methods used in tele-medicine.

Although a main use of a given memory card may be a use by the dedicated computer associated with the scanner and provided by the card supplier and operated by a particular physician, it is also useful to permit other devices and computers, wherever located, to be able to read and use some of the data that are stored on the card. To achieve this, the format and manner in which the data are stored on the card may be based on commonly used formats or protocols, for example, *.tif files for images, or can be special formats. When the formats are special or certain data restricted, the devices that are used to read the cards may have special applications that can recognize the cards and make use of the stored unrestricted data. The special applications could be carried on the cards themselves and loaded onto the reading devices automatically when the card is inserted, or could be loaded onto the reading devices from storage media or by downloading from a communication network.

By appropriately configuring the memory card or the computer or the card readers, or a combination of them, different levels of permission may be arranged for different users to vary the amount of information that a given user can read from the card, or the manner and scope of the uses of the data.

The context information can include time and calendar information and environmental information including temperature, lighting, and humidity, for example.

Information stored on the procedure device can include the brand, model, serial number, identification of procedures that can be performed, number of usages, calibration data, and parameter values, among other things.

Information stored on the host can include identification of usage regulating devices, users, locations of procedures, procedure devices, and computers, histories of the numbers of procedures authorized and used for each user, location, procedure device, and usage regulating device.

Information stored on the accounting system can include the prices charged and money received on account of each procedure that is authorized to be performed, whether the procedure was performed successfully, and whether the procedure has actually been performed and therefore can be accounted for as recognized revenue.

For record-keeping, audit, and control purposes, each procedure that is authorized and represented on a usage regulating device can be assigned a unique identifier 51. In addition, each usage regulating device can be assigned a unique identifier each associated with the identifiers of its authorized procedures. Data that are stored on the system can be tied to the procedure identifier, the regulating device identifier, or both.

The user interface of the computer can enable the user to enter, update, change, view, and analyze either all of the data associated with the system or only some portion of the data that the user is authorized to access. The user interface enables the user to register with the system, update his registration, interact with the usage regulating devices, enable the procedure device to be used in accordance with authorized procedures covered by a usage regulating device, and indicate when a procedure has been completed.

The analyzer can do mathematical analysis, image processing, modeling, analytical processing, spectral analysis, noise reduction, filtering, logical processing, and any other kind of analysis that may be appropriate for the procedure. The analyzer can produce revised, updated, noise-reduced, processed values, parameters, images, sounds, and video, measurements, judgments, diagnostic information (as permitted by FDA), recommendations regarding clinical management, and answers. The user can control the operation of the analyzer through the user interface and in other ways. The outputs of the analyzer and the computer are forms of procedure data.

Some of the control data are stored on the usage control and storage device before it is sold and delivered. Some of the control data are locked and may not be changed by the user. Some of the control data may be changed under certain circumstances without authorization from the party that is the source of the usage control and storage device.

Based on the control data stored on the card (for example, the serial number of the scanner with which the card is permitted to be used), the computer uses (and sometimes updates) the data on the card and controls use of the scanner in a manner that conforms to the conditions represented by the control data. For this purpose, the system can be set up to require that the usage control and storage device (e.g., the card) be in communication with the computer at the time when the usage permitted by the data on the usage control and storage device is occurring. For example, the card will be inserted into the computer to activate the system, remain in the computer during the procedure and report generation, will be removed from the computer for storage, and can be reinserted into the computer or another computer for later use. When the computer communicates, to the host, the identifier of the card and the identifiers of the authorized scans to confirm that they have been used, the card typically will not be in the computer. In some implementations, the memory card or the computer may include broadband communication capability to permit the connection to the host to be continually available.

To control the usage of the procedure device in compliance with the requirements of the data stored on the usage control and storage device, the computer may need other data and information from the procedure device (for example, the type and model number, the serial number), the current date and time from a clock, and information that is stored on or entered into the computer regarding, for example, the name and identification number of the user, the name of the patient, and the number of scans that are to be done, among other things. By analyzing the conditions on usage against information about the conditions under which the use is to be made, the computer can determine whether to permit the usage control and storage device to be used.

Once the computer determines that usage is permitted, it may unlock and enable the procedure device so that the user can perform, e.g., a scan of a lesion. The data that are generated during the use of the procedure device (for example, image data, spectral data, calibration data, context data, and operating parameters) is returned to the computer where it can be stored and used for analysis and other purposes. The analysis can be controlled by the user through the user interface or in other ways, or can proceed automatically. The results of the analysis may be additional data to be stored and presented to the user.

The data resulting from the scan and the results of the analysis of that data will typically be stored back to the usage control and storage device by the computer. Because these are patient data that may be subject to regulatory or institutional restrictions on its storage and use, once the data are stored on the usage control and storage device, they may be deleted from the computer. As each permitted usage occurs, the data in the usage control and storage device are updated to record that usage as having been spent. In some examples, at the same time, the computer could report the identifiers of the card and the permitted usages to the host for verification and control purposes to preclude misuse or non-permitted overuse of a card or use of a bogus card. Digital signature, encryption, and other techniques could also be used to reduce or prevent fraud. After data related to a skin scanning session has been provided to the host, that data may be (or may be required to be) deleted from the computer.

The usage control and storage device would typically be stored in the physical patient file that contains papers, notes, x-rays, and results of tests. Because the physical patient file is already subject to treatment that complies with privacy and other usage and storage requirements, the usage control and storage device is automatically treated in the same way. In the example of the use and operation of the system of FIG. 1 introduced above, the user is a physician. The procedure device is a skin scanner of the kind that can provide a recommendation for or against the biopsy to rule-out melanoma, as well as other important diagnostic information for the physician to consider, as described, for example, in U.S. Pat. No. 6,081,612, Systems and Methods for the Multispectral Imaging and Characterization of Skin Tissue, U.S. Pat. No. 6,208,749, Systems and Methods for the Multispectral Imaging and Characterization of Skin Tissue, and other United States and international patents and patent applications owned by Electro-Optical Sciences, all of which are incorporated by reference here. The subject is a patient having lesions that may include melanomas. The computer runs analytical software to process scanned multi-spectral data derived from the lesion using the device image. The network is the Internet. The supplier is a company that supplies the procedure device. The host is a computer system. The accounting system is a computer-based business accounting system.

In this example, suppose the physician, in visually scanning the skin of the patient, identifies lesions that may be suspicious for being melanoma. The physician decides to use the skin scanner to indicate whether a biopsy is needed to determine whether or not the lesion is a melanoma. Previously the physician had bought from the supplier a set of memory cards each for use in up to twenty scans for one patient (though the maximum number may be different depending on the circumstances). The physician inserts the card into a reader on the computer, uses the user interface to enter information about the patient, and arms the card to permit the scans of the patient. In the first scan, spectral image data are acquired from one of the lesions and are analyzed to generate a recommendation regarding the need for biopsy. After the scan and analysis are done (and while the next scan and analysis is occurring in parallel), the next lesion is scanned and the data are analyzed. Up to a total of twenty (or some other suitable number of) scans are done on the patient.

When the scanning is done, the physician indicates the completion of the scans on the user interface. The computer performs the analysis to generate the biopsy recommendation and other diagnostic information with respect to all of the scans and transfers all of the procedure data, including the results of the analyses and control data that have been newly generated to the memory card, and stores a record on the card of how many scans were completed. The computer also sends to the host the identifier of the card and the identifiers of the scans that were performed. The communication of this information to the host may occur the next time the computer needs to connect through the network to the host, for example, to conduct a field phantom test. Or the communication may occur at the time of the use of the card as mentioned above. The computer may also send procedure data and control data (but without any privacy-protected personal information) to the host for analysis and aggregation with other similar information for use in improving future versions of the skin scanner and the analyzer. These data may be deleted from the computer at the procedure location after communication to the host has been accomplished.

At the host location, before the memory cards were distributed to the physician, the identifiers of the cards and the identifiers of the authorized scans were stored on each of the cards and copies were stored on the host and in the accounting system. When payment was received for the cards, a record of the payment was associated with the card identifiers in the accounting system.

When the host receives the report of scans that have been performed, the accounting system identifies the card and the scans that have been performed and changes the books to show that the amounts of received money corresponding to those scans are as recognized revenue for the business. By handling the reporting of the usage of the skin scanner electronically and automatically, subsequent to storage card consumption, the system assures that revenue is booked at the appropriate time. Because the information about cards and their use is communicated to the host and the accounting system, procedures can be used to reduce or prevent misuse or fraudulent use of the memory cards, or unauthorized card replication based on the card identifiers, for example.

When the scanning is finished and reported to the host location, the physician removes the card from the reader and places it into the physical file for the patient where it can be kept temporarily or indefinitely. At any time later, the card can be attached again to the computer or to another computer (from which, for example, unrestricted data can be accessed for report generation or lesion visualization or consultation) and the stored control data and the procedure data can be accessed, viewed, printed, and (if permitted) edited, or forwarded to a consultant. Rather than sending the memory card to the consultant, the memory card could be placed into the computer at the procedure location and the data sent electronically to the consultant. Similarly, when a patient changes doctors, or a doctor winds up his or her practice, the card or the data on the card could be forwarded to the new physician.

Therefore the same card serves both functions of containing the patient information in a portable form to be held in a physical patient file, and of facilitating the automated reporting of finished scans and the realization of revenue on an accounting system for the scans that have been completed.

As implied by the discussion above, the system regulates the use of the procedure device so that a procedure can be performed only on the basis of an interaction between the computer and the procedure regulating device. The action that is managed or controlled by the cooperation of the memory cards and the computer can be the performance of a single scan or a set of scans or all of the scans to be performed on the patient during a single visit, or scans to be performed on a single patient on one or more visits, or some other group or category of scans.

Thus, the control data in some examples can be understood to represent a right or authority of the physician to perform an authorized scan or set of scans based on the price paid for the card.

In some implementations, the memory card may not only control the uses of the procedure device, but may also control the activation of procedure device as an initial matter.

In examples of the operation of the system, a given memory card may be committed to a particular procedure for a particular subject and may be configured to be non-reusable (spent) after the procedure is done. Once the memory card has been committed, revenue associated with the card can be recognized for accounting purposes.

The host can determine revenue associated with usage of memory cards over a period of time based on the information sent by the computer to the host periodically (e.g., once a week, once every two weeks, etc.).

In some implementations, each memory card has unique identifying information, such as an electronic key. Each card can enable a limited use of the procedure device. Some memory cards can be in the form of "base" memory cards that are configured to enable the procedure device, say, to perform twenty scans during a particular examination of a particular patient. Other memory cards can be configured as booster devices 59 which can allow a number of scans in addition to the number allowed by the base card, for example, an additional fifteen scans, at a different cost per scan than the base card. If payment has been associated with both the base card and the booster cards, the revenues for the examination could correspond to the total number of devices used during the examination. Different booster devices could represent different quantities of additional scans (e.g., five additional scans or fifteen additional scans) for different charges per card.

Memory cards, in addition to being held in a patient file, can be moved from clinician to clinician, like an x-ray.

The procedure data that are to be stored on the usage regulating device may be temporarily stored on another memory device, local or remote to the computer. The data may be stored in a relational database or other data structure and, depending on the application, may include one or more patient records. Access rights, security, and protocols may be applied consistently with privacy regulations.

When the procedure data are to be recorded on the usage regulating device, a data record is first initialized on the memory card using identifying information such as an electronic key. The procedure device can recognize the presence of the key and become enabled in response to the recognition of the key.

In some examples, instead of regulating the use of the procedure device by numbers of procedures, the regulation could be based on time or another metric.

A reporting device 61 can use data stored on any of the other elements of the system to provide printed or online reports of usage, revenue, performance, quality, or any other useful information.

Other implementations and applications are also within the scope of the claims.

Without limiting the range of covered implementations and applications, for example, the procedure device could be any kind of device used for diagnosis or therapy or any other kind of procedure on a subject. The subject could be a human or an animal or even a device or piece of equipment. The user could be a physician, other health care worker, clinician, cosmetician, health and wellness spa employee, retail store clerk, the subject himself or herself, and any other person capable of using the device to perform the procedure and performing it in a regulatorily-compliant manner. The computer could be any kind of computer or processor, including a handheld device, a hardware only device, or a combination of hardware and software. The computer that regulates use of the procedure device could be embedded as part of the procedure device.

The usage regulating device could be a memory device storing coded information, a paper or other substrate printed with machine readable codes, such as bar codes, that are inextricably tied to the physical device, a dongle, a key, or any other device that can carry information about the available authorized usages and serve as the basis for controlling the use of the procedure device or the reporting of usages to the host. In some implementations, the usage regulating device can use a USB (Universal Serial Bus) protocol.

The manner in which the computer interacts with the usage regulating device need not be a physical or mechanical connection, but could be done wirelessly using radio frequency communication or light or accomplished in other ways.

Each usage regulating device may be partly or completely dedicated or committed to an individual procedure, a set of procedures, all of the procedures for a particular subject, or any other appropriate grouping or classification.

Each usage regulation device could be configured to be non-reusable as to each authorized scan or as to the whole card.

In addition to using the data on the card at the host to control recognition of revenue, a wide variety of other uses could be made of the information. For example, the information could be used to control inventory of the memory cards or replacement supplies for the procedure device; to generate automatic customer orders (for instance when their supply drops below a certain level), to schedule sales person visits (based on how many times the procedure device is used compared to a target rate of use), and to target various marketing strategies to the users.

Although we have sometimes described the usage regulating device as being a physical item such as a memory card, the usage regulating device could be a virtual device (such as a password protected file on a remote computer) or any other kind of physical device.

The invention claimed is:

1. An apparatus comprising:
a portable memory card that conforms to a size, shape, and connection interface of an industry-standard memory card, the portable memory card comprising edges, and
a support holding the portable memory card, the support comprising grooves that engage the edges of the portable memory card, the portable memory card being smaller than the support, and at least some dimensions of the support being similar to a shape and size of an industry-standard credit card,
the support having a leading edge and being insertable with the portable memory card into a receptacle leading edge first along an insertion direction, the insertion direction being different from a direction along which the leading edge extends, the inserted support having the connection interface of the memory card mated with a corresponding connection interface of the receptacle, and
the support having an alignment slot that opens at the leading edge and extends into the support along a direction opposite to the insertion direction.

2. An apparatus comprising
a portable memory card that conforms to a size, shape, and connection interface of an industry-standard memory card, the portable memory card comprising an upper surface and a lower surface, and
a support holding the portable memory card, the lower surface of the portable memory card being attached to and partially covered by a portion of the support, the portable memory card being smaller than the support, and at least some dimensions of the support being similar to a shape and size of an industry-standard credit card,
the support having a leading edge and being insertable with the portable memory card into a receptacle leading edge first along an insertion direction, the insertion direction being different from a direction along which the leading edge extends, the inserted support having the connection interface of the memory card mated with a corresponding connection interface of the receptacle, and
the support having an alignment slot that opens at the leading edge and extends into the support along a direction opposite to the insertion direction.

3. The apparatus of claim 1 or claim 2 in which the alignment slot corresponds to an alignment tab on the receptacle, the alignment slot and the alignment tab permitting insertion of the support into the receptacle to enable mating of the corresponding connection interfaces and to prevent insertion of the support into the receptacle otherwise.

4. The apparatus of claim 3 in which the alignment slot is wider at its opening than the width of the alignment tab.

5. The apparatus of claim 1 or claim 2 in which the memory card is between one side of the alignment slot and an edge of the support.

6. The apparatus of claim 5 in which the leading edge of the support is broader than an edge of the memory card that bears the connection interface.

7. The apparatus of claim 1 or claim 2 in which the alignment slot includes a tapered edge.

8. The apparatus of claim 1 or claim 2 in which the memory card comprises a Secure Digital (SD) card.

9. The apparatus of claim 1 or claim 2 in which the support comprises a plastic housing.

10. The apparatus of claim 9 in which the support includes a cover attached to the plastic housing and the memory card is between the cover and the housing.

11. The apparatus of claim 1 or claim 2 in which the support comprises a cover that includes a metalized sheet.

12. The apparatus of claim 11 in which the support comprises a housing and the cover is permanently attached to the housing.

13. The apparatus of claim 1 or claim 2 in which the support bears a label to receive writing.

14. The apparatus of claim 1 or claim 2 in which the receptacle is part of a medical device.

15. The apparatus of claim 1 or claim 2 in which the memory card contains data representing a diagnostic image of a patient.

16. The apparatus of claim 15 in which the data relates to skin of the patient.

17. The apparatus of claim 1 or claim 2 in which the support comprises a housing and a cover, the cover being epoxied to the housing and the portable memory card.

18. The apparatus of claim 1 or claim 2 in which the memory card is attached to the support in a manner that renders the memory card unusable in a normal way if the memory card is removed from the support.

19. A unit for storing diagnostic image data of skin of a patient from a medical device, the unit comprising
a Secure Digital (SD) memory card to hold the data, the SD memory card having edges,
a support in which the SD memory card is held, the support comprising grooves that engage the edges of the SD memory card, the support having a leading edge to be inserted into a reader of the medical device and having sizes similar to an industry-standard credit card,
the support having an alignment slot along the leading edge to mate with an alignment tab of a receptacle of the medical device, the alignment slot being offset along the leading edge to prevent the support from being inserted incorrectly into the receptacle, the alignment slot including a tapered edge to guide the support into the receptacle,
the SD memory card having sockets exposed along the leading edge to one side of the alignment slot,
the support including a housing and a cover with the SD memory card between the housing and the cover,
the SD memory card being attached to the support in a manner that renders the SD memory card unusable in a normal way if the SD memory card is removed from the support.

20. A unit for storing diagnostic image data of skin of a patient from a medical device, the unit comprising
a Secure Digital (SD) memory card to hold the data, the memory card comprising an upper surface and a lower surface,
a support in which the memory card is held, the lower surface of the memory card being attached to and partially covered by the support, the support having a leading edge to be inserted into a reader of the medical device and having sizes similar to an industry-standard credit card,
the support having an alignment slot along the leading edge to mate with an alignment tab of a receptacle of the medical device, the alignment slot being offset along the leading edge to prevent the support from being inserted incorrectly into the receptacle, the alignment slot including a tapered edge to guide the support into the receptacle,
the memory card having sockets exposed along the leading edge to one side of the alignment slot,
the support including a housing and a cover with the memory card between the housing and the cover,
the memory card being attached to the support in a manner that renders the memory card unusable in a normal way if the memory card is removed from the support.

* * * * *